United States Patent
Zhao et al.

(10) Patent No.: US 10,370,602 B2
(45) Date of Patent: Aug. 6, 2019

(54) APPARATUS AND METHOD FOR PRODUCING DIESEL FUEL AND JET FUEL USING FISCHER-TROPSCH SYNTHETIC OIL

(71) Applicant: WUHAN KAIDI ENGINEERING TECHNOLOGY RESEARCH INSTITUTE CO., LTD., Wuhan (CN)

(72) Inventors: Tao Zhao, Wuhan (CN); Bo Lai, Wuhan (CN); Weiguang Yang, Wuhan (CN); Dawei Wang, Wuhan (CN); Xuewen Hao, Wuhan (CN); Yanjie Zhou, Wuhan (CN); Li Xu, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 0 days.

(21) Appl. No.: 15/694,878

(22) Filed: Sep. 4, 2017

(65) Prior Publication Data
US 2017/0362518 A1    Dec. 21, 2017

Related U.S. Application Data

(63) Continuation-in-part of application No. PCT/CN2016/074634, filed on Feb. 26, 2016.

(30) Foreign Application Priority Data

Mar. 5, 2015   (CN) .......................... 2015 1 0097716

(51) Int. Cl.
*B01J 19/24* (2006.01)
*C10G 65/12* (2006.01)
(Continued)

(52) U.S. Cl.
CPC ............ *C10G 67/02* (2013.01); *B01J 19/245* (2013.01); *C10G 45/02* (2013.01); *C10G 47/00* (2013.01);
(Continued)

(58) Field of Classification Search
CPC ........ C10G 67/02; C10G 65/14; C10G 65/12; C10G 47/00; C10G 45/02; C10G 2400/04;
(Continued)

(56) References Cited

U.S. PATENT DOCUMENTS

2011/0315596 A1* 12/2011 Prentice ................. C10G 45/64
                                                             208/59

FOREIGN PATENT DOCUMENTS

CN           103146526        *   6/2013

* cited by examiner

*Primary Examiner* — Randy Boyer
*Assistant Examiner* — Juan C Valencia
(74) *Attorney, Agent, or Firm* — Matthias Scholl P.C.; Matthias Scholl

(57) ABSTRACT

An apparatus for producing diesel fuel and jet fuel using Fischer-Tropsch synthetic oil, the apparatus including a hydrofining reactor, a hot separator, a first rectifying column, a hydrocracking reactor, a hydroisomerization reactor, a second rectifying column, a first mixing chamber and a second mixing chamber. The hydrofining reactor includes a raw material inlet and a hydrofining product outlet. The hot separator includes a separated oil outlet and a hydrofining product inlet which is connected to the hydrofining product outlet. The first rectifying column includes a tail oil fraction outlet, a diesel fraction outlet and a separated oil inlet which is connected to the separated oil outlet. The first mixing
(Continued)

chamber includes a circulating hydrogen inlet, a first mixture outlet and a tail oil fraction inlet which is connected to the tail oil fraction outlet.

9 Claims, 1 Drawing Sheet

(51) Int. Cl.
    *C10G 67/02*     (2006.01)
    *C10G 45/02*     (2006.01)
    *C10G 47/00*     (2006.01)
    *C10G 65/14*     (2006.01)

(52) U.S. Cl.
    CPC .............. *C10G 65/12* (2013.01); *C10G 65/14* (2013.01); *B01J 2219/24* (2013.01); *C10G 2300/1022* (2013.01); *C10G 2400/04* (2013.01)

(58) Field of Classification Search
    CPC ............ C10G 2300/1022; B01J 19/245; B01J 2219/24
    See application file for complete search history.

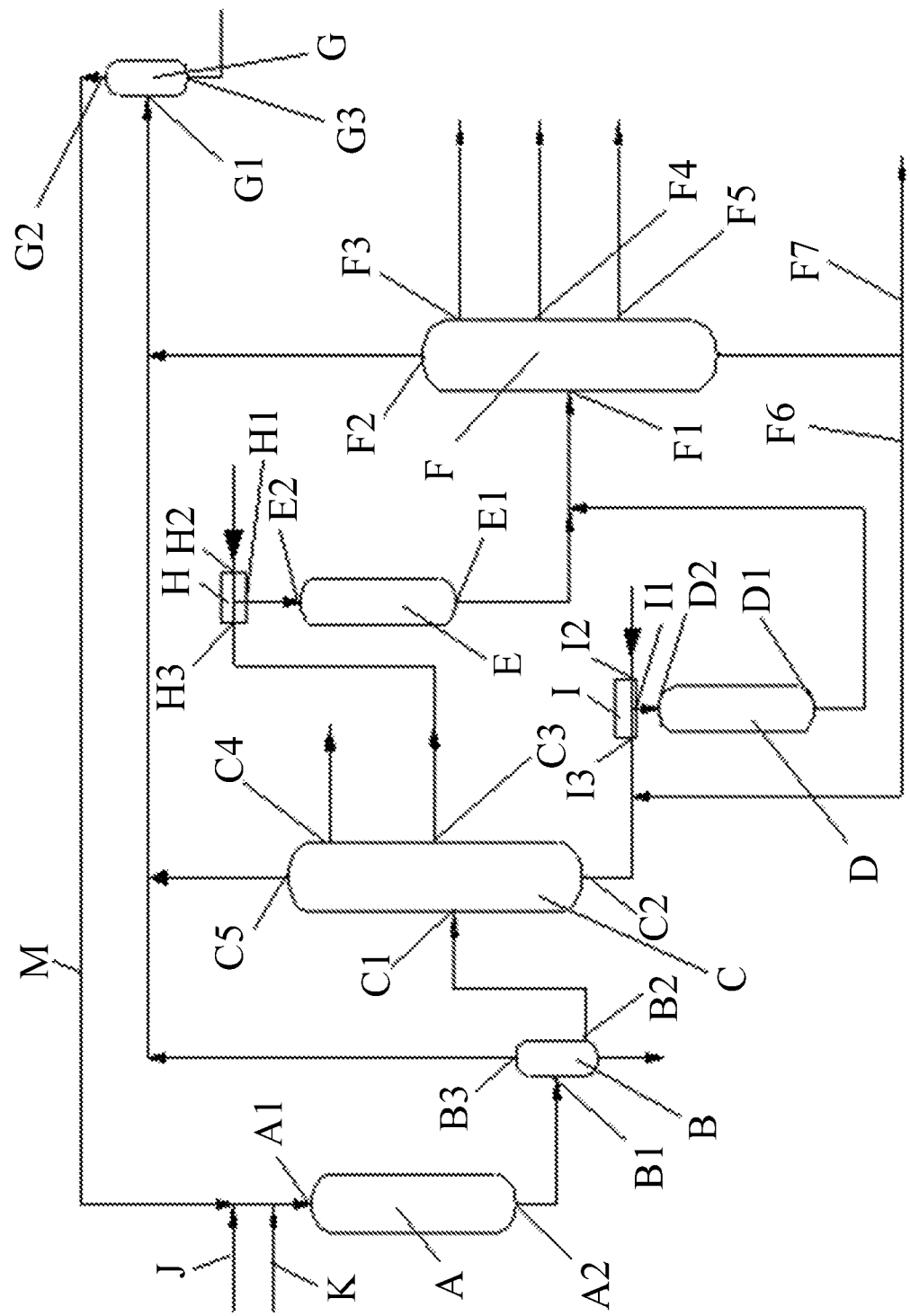

APPARATUS AND METHOD FOR PRODUCING DIESEL FUEL AND JET FUEL USING FISCHER-TROPSCH SYNTHETIC OIL

CROSS-REFERENCE TO RELATED APPLICATIONS

This application is a continuation-in-part of International Patent Application No. PCT/CN2016/074634 with an international filing date of Feb. 26, 2016, designating the United States, now pending, and further claims foreign priority to Chinese Patent Application No. 201510097716.2 filed Mar. 5, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to an apparatus and method for producing diesel fuel and jet fuel using Fischer-Tropsch synthetic oil.

Description of the Related Art

Fischer-Tropsch synthetic oil contains no sulfur, no nitrogen and no aromatic hydrocarbons and is eco-friendly. However, synthetic crude oil contains a relatively large amount of hydrocarbons and oxygenated compounds. Accordingly, when the synthetic crude oil directly contacts an isocracking catalyst, the stability and service life of the catalyst are adversely affected.

In addition, conventional hydroprocessing of Fischer-Tropsch synthetic oil requires a circulating hydrogen compressor, increasing the investment and maintenance costs. In addition, the reaction temperature and pressure vary greatly, causing the formation of coking, the produced product is inferior in quality, and the diesel fuel yield is low.

SUMMARY OF THE INVENTION

In view of the above-described problems, it is one objective of the invention to provide an apparatus and method for producing diesel fuel and jet fuel using Fischer-Tropsch synthetic oil. The method comprises hydrofining and hydroupgrading.

Fischer-Tropsch synthetic oil mixes with hydrogen first and then enters a hydrofining reactor. The products in the hydrofining reactor are introduced to a fractionating column to produce naphtha fractions as ethylene pyrolysis materials. Diesel fractions enter a hydroisomerization reactor and the tail oil enters a hydrocracking reactor. The products of the hydroisomerization reactor and the hydrocracking reactor mix and then enter a fractionating column to produce aviation kerosene and diesel products. Compared to the conventional refining-cracking techniques, the apparatus and method of the invention can produce high-quality and high yield of diesel, aviation kerosene and wax oil, feature low investment cost and reasonable operating period.

To achieve the above objective, in accordance with one embodiment of the invention, there is provided an apparatus for producing diesel fuel and jet fuel using Fischer-Tropsch synthetic oil, the apparatus comprising a hydrofining reactor, a hot separator, a first rectifying column, a hydrocracking reactor, a hydroisomerization reactor, a second rectifying column, a first mixing chamber and a second mixing chamber.

The hydrofining reactor comprises a raw material inlet and a hydrofining product outlet.

The hot separator comprises a separated oil outlet and a hydrofining product inlet which is connected to the hydrofining product outlet.

The first rectifying column comprises a tail oil fraction outlet, a diesel fraction outlet and a separated oil inlet which is connected to the separated oil outlet.

The first mixing chamber comprises a circulating hydrogen inlet, a first mixture outlet and a tail oil fraction inlet which is connected to the tail oil fraction outlet.

The hydrocracking reactor comprises a hydrocracking product outlet and a first mixture inlet which is connected to the first mixture outlet.

The second mixture chamber comprises a renewal hydrogen inlet, a second mixture outlet and a diesel fraction inlet connected to the diesel fraction outlet.

The hydroisomerization reactor comprises a hydroisomerization product outlet and a second mixture inlet which is connected to the second mixture outlet.

The second rectifying column comprises an aviation kerosene outlet, a diesel outlet and a hydrogenation product mixture inlet which is connected to the hydrocracking product outlet and the hydroisomerization product outlet.

In a class of this embodiment, the apparatus also comprises a condensation fractionating column. The condensation fractionating column comprises a gas inlet, a fourth gas outlet and a liquid outlet.

The hot separator further comprises a first gas outlet. The first rectifying column further comprises a second gas outlet. The second rectifying column further comprises a third gas outlet.

The first gas outlet of the hot separator, the second gas outlet of the first rectifying column and the third gas outlet of the second rectifying column each connect to the gas inlet of the condensation fractionating column. The fourth gas outlet of the condensation fractionating column is connected to the raw material inlet of the hydrofining reactor.

The second rectifying column further comprises a naphtha fraction outlet and a discharge pipe of the tail oil fraction and paraffin. The first rectifying column further comprises a naphtha fraction outlet. The discharge pipe of the tail oil fraction and paraffin is connected to the tail oil inlet of the first mixing chamber. The discharge pipe of the tail oil fraction and paraffin is connected to a paraffin outlet through a tee joint.

The pipe between the fourth gas outlet and the raw material inlet of the hydrofining reactor is connected to an oil mixture inlet pipe and a circulating hydrogen inlet pipe.

In another aspect, one embodiment of the invention also provides a method for producing diesel fuel and jet fuel using the apparatus, the method comprising the following steps:

Step 1: transporting Fischer-Tropsch synthetic oil to the pipe through an oil mixture inlet pipe, introducing circulating hydrogen to the pipe through the circulating hydrogen inlet pipe, mixing and inputting the circulating hydrogen and the Fischer-Tropsch synthetic oil to the hydrofining reactor via the raw material inlet for a hydrofining reaction in the presence of a hydrofining catalyst to produce hydrofining products;

Step 2: allowing the hydrofining products to enter the hot separator via the hydrofining product inlet to produce separated oil and cracking oil gas; discharging the separated oil via the separated oil outlet and introducing the separated oil to the first rectifying column via the separated oil inlet, discharging the cracking oil gas via the first gas outlet of the hot separator;

Step 3: rectifying the separated oil in Step 2 to yield tail oil, diesel and naphtha fractions and cracking oil gas in the first rectifying column; discharging the tail oil fraction through the tail oil fraction outlet and allowing the tail oil fraction to enter the first mixing chamber through the tail oil fraction inlet; allowing the circulating hydrogen to enter the first mixing chamber through the circulating hydrogen inlet; mixing the tail oil fraction and the circulating hydrogen in the first mixing chamber and allowing a resulting mixture to enter the hydrocracking reactor through the first mixture outlet and the first mixture inlet; discharging the diesel fraction through the diesel fraction outlet and allowing the diesel fraction to enter the second mixing chamber through the diesel fraction inlet; introducing renewal hydrogen to enter the second mixing chamber through the renewal hydrogen inlet; mixing the diesel fraction and the renewal hydrogen in the second mixing chamber and allowing a resulting mixture to enter the hydroisomerization reactor through the second mixture outlet and the second mixture inlet; and discharging the cracking oil gas through the second gas outlet;

Step 4: hydrocracking the tail oil fraction and the circulating hydrogen in the hydrocracking reactor to produce hydrocracking products; hydroisomerizing the diesel fraction and the renewal hydrogen in the hydroisomerization reactor to produce hydroisomerization products;

Step 5: discharging the hydrocracking products through the hydrocracking product outlet; discharging the hydroisomerization products through the hydroisomerization product outlet; mixing the hydrocracking products and the hydroisomerization products and allowing a resulting mixture to enter the second rectifying column through the hydrogenation product mixture inlet; rectifying the mixture of the hydrocracking products and the hydroisomerization products to produce cracking oil gas, aviation kerosene, diesel, paraffin, the tail oil fraction and the naphtha fraction in the second rectifying column; guiding the aviation kerosene to an aviation kerosene tank through the aviation kerosene outlet, guiding the diesel to a diesel tank through the diesel outlet; guiding the naphtha fraction to a naphtha fraction tank through the naphtha fraction outlet;

when aviation kerosene and diesel are the main products, guiding a mixture of the tail oil fraction and paraffin along the discharge pipe of the tail oil fraction and paraffin to enter the first mixing chamber via the tail oil fraction inlet to mix with the circulating hydrogen, and then enter the hydrocracking reactor; when paraffin is the main product, discharging the mixture of the tail oil fraction and paraffin through the paraffin outlet; and discharging the produced cracking oil gas through the third gas outlet of the second rectifying column; and Step 6: mixing and introducing the discharged cracking oil gas in steps 2, 3 and 5 to the condensation fractionating column via the gas inlet, to yield gas and liquid; discharging the gas via the fourth gas outlet and then allowing the gas to enter the hydrofining reactor via the raw material inlet for cyclic utilization;

and discharging the liquid via the liquid outlet and then converging the liquid with the naphtha fraction to yield ethylene pyrolysis materials.

The apparatus and method of the invention provide a moderate operating condition for hydroisomerization reactions of diesel and aviation kerosene, reducing cracking reactions to the greatest extent and achieving the highest yield of diesel and aviation kerosene. The wax oil fraction passes through the reactor with a catalyst having hydrocracking and isomerization functions for hydrocracking and isomerization reactions to produce diesel that meets the national standard IV for diesel and 3# aviation kerosene and the yield of diesel and aviation kerosene is high. In addition, the method can also produce paraffin, can adjust production plans according to production requirements, and overcomes the shortcomings of the tradition proposals introduced in the background art which includes short operating period, poor product quality, strict reaction conditions, less flexibility of operation and low yield of diesel. The diesel and aviation kerosene produced by the invention have a high yield. The cetane number of the diesel can exceed 60; the condensation point of the diesel is less than 0° C.; and the diesel can be used as a diesel blending composition or a diesel product. The smoke point of the aviation kerosene is greater than 25 mm; the freezing temperature of the aviation kerosene is less than −47° C.; and the aviation kerosene can be used as 3# jet fuel or a blending composition. The technical method has the advantages that the flow is simple, the reaction condition is moderate, the production plan is flexible, the operating cost is low and it is easy to apply the method in industrial production.

BRIEF DESCRIPTION OF THE DRAWINGS

The invention is described hereinbelow with reference to accompanying drawings, in which the sole FIGURE is a structural diagram of an apparatus for producing diesel fuel and jet fuel using Fischer-Tropsch synthetic oil in accordance with one embodiment of the invention.

Legend: A. Hydrofining Reactor, A1. Raw Material Inlet, A2. Hydrofining Product Outlet, B. Hot separator, B1. Hydrofining Product Inlet, B2. Separated Oil Outlet, B3. First Gas Outlet, C. First Rectifying Column, C1. Separated Oil Inlet, C2. Tail Oil Fraction Outlet, C3. Diesel Fraction Outlet, C4. Naphtha Fraction Outlet, C5. Second Gas Outlet, D. Hydrocracking Reactor, D1. Hydrocracking Product Outlet, D2. First Mixture Inlet, E. Hydroisomerization Reactor, E1. Hydroisomerization Product Outlet, E2. Second Mixture Inlet, F. Second Rectifying Column, F1. Hydrogenation Product Mixture Inlet, F2. Third Gas Outlet, F3. Naphtha Fraction Outlet, F4. Aviation Kerosene Outlet, F5. Diesel Outlet, F6. Discharge Pipe of Tail Oil Fraction and Paraffin, F7. Paraffin Outlet, G. condensation Fractionating Column, G1. Gas Inlet, G2. Fourth Gas Outlet, G3. Liquid Outlet, H. Second Mixing Chamber, H1. Mixture Outlet, H2. Renewal hydrogen inlet, H3. Diesel Fraction Inlet, I. First Mixing Chamber, I1. First Mixture Outlet, I2. Circulating Hydrogen Inlet, I3. Tail Oil Fraction Inlet, J. Oil Mixture Inlet Pipe, K. Circulating Hydrogen Inlet Pipe.

DETAILED DESCRIPTION OF THE EMBODIMENTS

The invention is further illustrated with the following FIGURE and embodiments.

The apparatus for producing diesel fuel and jet fuel using Fischer-Tropsch synthetic oil in the sole FIGURE comprises a hydrofining reactor A, a hot separator B, a first rectifying column C, a hydrocracking reactor D, a hydroisomerization reactor E, a second rectifying column F, a first mixing chamber I and a second mixing chamber H.

The hydrofining reactor A comprises a raw material inlet A1 and a hydrofining product outlet A2.

The hot separator B comprises a separated oil outlet B2 and a hydrofining product inlet B1 which is connected to the hydrofining product outlet A2.

The first rectifying column C comprises a tail oil fraction outlet C2, a diesel fraction outlet C3 and a separated oil inlet C1 which is connected to the separated oil outlet B2.

The first mixing chamber I comprises a circulating hydrogen inlet I2, a first mixture outlet I1 and a tail oil fraction inlet I3 which is connected to the tail oil fraction outlet C2.

The hydrocracking reactor D comprises a hydrocracking product outlet D1 and a first mixture inlet D2 which is connected to the first mixture outlet I1.

The second mixture chamber H comprises a renewal hydrogen inlet H2, a second mixture outlet H1 and a diesel fraction inlet H3 connected to the diesel fraction outlet C3.

The hydroisomerization reactor E comprises a hydroisomerization product outlet E1 and a second mixture inlet which is connected E2 with the second mixture outlet H1.

The second rectifying column F comprises an aviation kerosene outlet F4, a diesel outlet F5 and a hydrogenation product mixture inlet F1 which is connected to hydrocracking product outlet D1 and the hydroisomerization product outlet E1.

In the technical proposal, the apparatus comprises a condensation fractionating column G. The condensation fractionating column G comprises a gas inlet G1, a fourth gas outlet G2 and a liquid outlet G3.

The hot separator B further comprises a first gas outlet B3. The first rectifying column C further comprises a second gas outlet C5. The second rectifying column F further comprises a third gas outlet F2.

The first gas outlet B3 of the hot separator B, the second gas outlet C5 of the first rectifying column C and the third gas outlet F2 of the second rectifying column F each connect to the gas inlet G1 of the condensation fractionating column G. The fourth gas outlet G2 of the condensation fractionating column G is connected to the raw material inlet A1 of the hydrofining reactor A.

The second rectifying column F further comprises a naphtha fraction outlet F3 and a discharge pipe F6 for cyclic utilization of the tail oil fraction and paraffin. The first rectifying column C further comprises a naphtha fraction outlet C4. The discharge pipe F6 of the tail oil fraction and paraffin is connected to the tail oil inlet I3 of the first mixing chamber I. The discharge pipe F6 of the tail oil fraction and paraffin is connected to a paraffin outlet F7 through a tee joint. (The design can improve the flexibility of production. When more aviation kerosene and diesel products need to produce, the mixture of tail oil fraction and paraffin produced in Step 5 (More than 95% of the mixture is paraffin) is discharged through the discharge pipe F6 of the tail oil fraction and paraffin, then enters the first mixing chamber I through the tail oil fraction inlet I3 to mix with the circulating hydrogen, and finally enters the hydrocracking reactor D. When paraffin products need to produce, the mixture of tail oil fraction and paraffin produced in Step 5 is discharged through the paraffin outlet F7).

The pipe M between the fourth gas outlet G2 and the raw material inlet A1 of the hydrofining reactor A is connected to an oil mixture inlet pipe J and a circulating hydrogen inlet pipe K.

The method for producing diesel fuel and jet fuel using the apparatus comprises the following steps:

Step 1: The Fischer-Tropsch synthetic oil is transported to the pipe M through an oil mixture inlet pipe J. The circulating hydrogen is transported to the pipe M through the circulating hydrogen inlet pipe K. The circulating hydrogen and the Fischer-Tropsch synthetic oil fully mix and enter the hydrofining reactor A through the raw material inlet A1 for the hydrofining reaction in the presence of a hydrofining catalyst to produce hydrofining products.

Step 2: The hydrofining products in Step 1 enter the hot separator B through the hydrofining product inlet B1 to produce separated oil and cracking oil gas. The separated oil is discharged through the separated oil outlet B2 and then enters the first rectifying column C through the separated oil inlet C1. The cracking oil gas is discharged through the gas outlet B3 of the hot separator B.

Step 3: The separated oil in Step 2 is rectified into tail oil, diesel and naphtha fractions and cracking oil gas through the first rectifying column C. The tail oil fraction is discharged through the tail oil fraction outlet C2 and enters the first mixing chamber I through the tail oil fraction inlet I3. The circulating hydrogen enters the first mixing chamber I through the circulating hydrogen inlet I2. The tail oil fraction and the circulating hydrogen mix in the first mixing chamber I and then enter the hydrocracking reactor D through the first mixture outlet I1 and the first mixture inlet D2. The diesel fraction is discharged through the diesel fraction outlet C3 and enters the second mixing chamber H through the diesel fraction inlet H3. Renewal hydrogen enters the second mixing chamber H through the renewal hydrogen inlet H2. The diesel fraction and the renewal hydrogen mix in the second mixing chamber H and then enter the hydroisomerization reactor E through the second mixture outlet H1 and the second mixture inlet E2. The cracking oil gas is discharged through the second gas outlet C5.

Step 4: In the hydrocracking reactor D, the tail oil fraction and the circulating hydrogen produce hydrocracking products through the hydrocracking reaction. In the hydroisomerization reactor E, the diesel fraction and the renewal hydrogen produce hydroisomerization products through the hydroisomerization reaction.

Step 5: The hydrocracking product is discharged through the hydrocracking product outlet D1. The hydroisomerization product is discharged through the hydroisomerization product outlet E1. The discharged hydrocracking product and the discharged hydroisomerization product mix and then enter the second rectifying column F through the hydrogenation product mixture inlet F1. The mixture of the hydrocracking and hydroisomerization products produces cracking oil gas, aviation kerosene, diesel, paraffin, the tail oil fraction and the naphtha fraction through the second rectifying column F (separate corresponding fractions according to different temperatures). The aviation kerosene is transported to the aviation kerosene tank through the aviation kerosene outlet F4. The diesel is transported to the diesel tank through the diesel outlet. The naphtha fraction is transported to the naphtha fraction through the naphtha fraction outlet F3. The naphtha fraction can be used as ethylene pyrolysis materials When aviation kerosene and diesel are the main products, the produced mixture of the tail oil fraction and paraffin (Over 95% of the mixture is paraffin.) is discharged through the discharge pipe F6 for cyclic utilization of the tail oil fraction and paraffin, enters the first mixing chamber I through the tail oil fraction inlet I3 to mix with the circulating hydrogen, and then enters the hydrocracking reactor D. When paraffin is the main product, the produced mixture of the tail oil fraction and paraffin is discharged through the paraffin outlet F7, and enters the paraffin tank. The produced cracking oil gas in Step 5 is discharged through the third gas outlet F2 of the second rectifying column F.

Step 6: The discharged cracking oil gas mixture in Steps 2, 3 and 5 enters the condensation fractionating column G through the gas inlet G1. Through condensation, gas and liquid are produced. The gas is discharged through the fourth gas outlet G2 and then enters the hydrofining reactor A through the raw material inlet A1 for cyclic utilization. The liquid is discharged through the liquid outlet G3 and then converge with the naphtha fraction to serve as ethylene pyrolysis materials.

In the technical proposal, Fischer-Tropsch synthetic oil used in Step 1 comprises the low-temperature Fischer-Tropsch synthetic oil (ranging between 200° C. and 240° C.), or high-temperature Fischer-Tropsch synthetic oil (ranging between 250° C. and 350° C.), or part and/or full-range distillates of the oil mixture of the low-temperature Fischer-Tropsch synthetic oil and high-temperature Fischer-Tropsch synthetic oil.

The reaction conditions of the hydrofining reactor A in Step 1 of the technical proposal are as follows:

The reaction temperature ranges between 260° C. and 400° C.; the reaction pressure ranges between 2.0 MPa and 20.0 MPa; the liquid hourly space velocity ranges between 0.5 $h^{-1}$ and 3.0 $h^{-1}$; and the volume ratio of hydrogen to oil ranges between 500:1 and 2000:1.

The hydroisomerization reaction conditions in the hydroisomerization reactor E in Step 4 of the technical proposal are as follows:

The reaction temperature ranges between 280° C. and 400° C.; the reaction pressure ranges between 4.0 MPa and 15.0 MPa; the liquid hourly space velocity ranges between 0.5 $h^{-1}$ and 3.0 $h^{-1}$; and the volume ratio of hydrogen to oil ranges between 500:1 and 2000:1.

The hydrocracking reaction conditions of the hydrocracking reactor D in Step 4 of the technical proposal are as follows:

The reaction temperature ranges between 280° C. and 450° C.; the reaction pressure ranges between 5.0 MPa and 20.0 MPa; the liquid hourly space velocity ranges between 0.5 $h^{-1}$ and 3.0 $h^{-1}$; and the volume ratio of hydrogen to oil ranges between 500:1 and 2000:1.

The preferred hydrofining conditions of the hydrofining reactor A in Step 1 of the technical proposal are as follows:

The reaction temperature ranges between 280° C. and 390° C.; the reaction pressure ranges between 4.0 MPa and 15.0 MPa; the liquid hourly space velocity ranges between 0.5 $h^{-1}$ and 2.0 $h^{-1}$; and the volume ratio of hydrogen to oil ranges between 500:1 and 1500:1.

The preferred hydroisomerization reaction conditions of the hydroisomerization reactor E in Step 4 of the technical proposal are as follows:

The reaction temperature ranges between 280° C. and 370° C.; the reaction pressure ranges between 5.0 MPa and 12.0 MPa; the liquid hourly space velocity ranges between 0.5 $h^{-1}$ and 2.0 $h^{-1}$; and the volume ratio of hydrogen to oil ranges between 500:1 and 1500:1.

The preferred hydrocracking reaction conditions of the hydrocracking reactor D in Step 4 of the technical proposal are as follows:

The reaction temperature ranges between 320° C. and 400° C.; the reaction pressure ranges between 5.0 MPa and 15.0 MPa; the liquid hourly space velocity ranges between 0.5 $h^{-1}$ and 2.0 $h^{-1}$; and the volume ratio of hydrogen to oil ranges between 700:1 and 1500:1.

The invention is specifically illustrated by taking the high and low-temperature synthetic distillates as raw materials. Refer to Table 1 for the properties of high and low-temperature synthetic distillates.

According to the process shown in the sole FIGURE, after hydrofining, the Fischer-Tropsch synthetic product is fractionated to produce dry gas, naphtha, diesel and heavy oil. The dry gas goes through the gas-liquid separator G as the circulating hydrogen. The naphtha fraction serves as ethylene pyrolysis materials. The diesel fraction enters the hydroisomerization reactor E. the heavy oil enters the hydrocracking reactor D.

TABLE 1

Properties of Full-range Low and High-temperature Synthetic Distillates

| Items | Low temperature F-T synthetic oil | High temperature F-T synthetic oil |
|---|---|---|
| Density/g · $cm^{-3}$ | 0.7961 | 0.8224 |
| Oxygen content/wt. % | 6.8 | 10.2 |
| Sulphur content/µg · $g^{-1}$ | <10 | <10 |
| Nitrogen content/µg · $g^{-1}$ | <10 | <10 |
| Olefin content/wt. % | 26 | 54 |
| Arene content/wt. % | 3 | 27 |
| Boiling range (ASTM-D1160) | | |
| IBP/50% | 52/378 | 69/153 |
| 90%/95% | 562/>650 | 331/352 |

Example 1

The raw materials of the embodiment are low-temperature synthetic oil and the high-temperature synthetic oil. The ratio of the low-temperature synthetic oil to the high-temperature synthetic oil is 1:1. The operating conditions of the hydrocracking reactor D are as follows: the reaction pressure is 5 MPa; the reaction temperature is 340° C., the liquid hourly space velocity is 0.8 $h^{-1}$ and the volume ratio of hydrogen to oil is 700:1. The operating conditions of the hydroisomerization reactor E are as follows: the reaction temperature is 330° C., the reaction pressure is 5 MPa, the liquid hourly space velocity is 0.5 $h^{-1}$ and the volume ratio of hydrogen to oil is 700:1. The hydrofining and hydrocracking sections serve as comparison tests. The operating conditions and product properties are listed in Tables 2 and 3.

TABLE 2

Operating Conditions in Example 1 and Comparison example

| Items | Example 1 | Comparison example |
|---|---|---|
| Technical Process | Partial Circulation of the Tail Oil | Partial Circulation of the Tail Oil |
| Hydrofining/Hydrocracking/Isomerism Catalyst | Hydrofining Agent 1/Hydrocracking Agent 1/Isomerism Agent 1 | Hydrofining Agent 1/Hydrocracking Agent 1 |
| Reaction Pressure/MPa | 5.0 | 6.0 |
| Refining/Modification/Isomerism Liquid Hourly Space Velocity/$h^{-1}$ | 1.0/0.8/0.5 | 0.8/1.0 |
| Refining/Modification/Isomerism Reaction Temperature/° C. | 320/350/330 | 320/360 |
| Volume Ratio of Hydrogen to Oil | 700:1 | 700:1 |

TABLE 3

Properties of Aviation Kerosene and Diesel

| Item | Example 1 | Comparison example |
|---|---|---|
| Aviation Kerosene | | |
| Smoke Point/mm | 26 | 22 |
| Freezing Point/° C. | <−48 | −43° C. |
| Density/g · cm$^{-3}$ | 0.7723 | 0.7835 |
| Boiling Range (ASTM-D1160) | | |
| IBP/10% | 132/148 | 130/151 |
| 50%/90% | 189/211 | 195/218 |
| 95%/EBP | 236/258 | 240/267 |
| Yield/% | 37 | 26 |
| Diesel | | |
| Density/g · cm$^{-3}$ | 0.8046 | 0.7976 |
| Condensation Point/° C. | −21° C. | −6° C. |
| Cetane Number | 61 | 64 |
| Boiling Range (ASTM-D1160) | | |
| IBP/10% | 248/272 | 252/286 |
| 50%/90% | 304/326 | 318/345 |
| 95%/EBP | 341/358 | 358/379 |
| Yield/% | 37 | 23 |

Example 2

The raw materials of the embodiment are low-temperature synthetic oil and the high-temperature synthetic oil. The ratio of the low-temperature synthetic oil to the high-temperature synthetic oil is 2:1. The operating conditions of the hydrocracking reactor D are as follows: the reaction pressure is 7 MPa; the reaction temperature is 375° C., the liquid hourly space velocity is 1.3 h$^{-1}$ and the volume ratio of hydrogen to oil is 900:1. The operating conditions of the hydroisomerization reactor E are as follows: the reaction temperature is 350° C., the reaction pressure is 7 MPa, the liquid hourly space velocity is 1.0 h$^{-1}$ and the volume ratio of hydrogen to oil is 900:1. The hydrofining and hydrocracking sections serve as comparison tests. The operating conditions and product properties are listed in Tables 4 and 5.

TABLE 4

Operating Conditions in Example 2 and Comparison example

| Items | Example 2 | Comparison example |
|---|---|---|
| Technical Process | Full Circulation of the Tail Oil | Full Circulation of the Tail Oil |
| Hydrofining/Hydrocracking/Isomerism Catalyst | Hydrofining Agent 2/Hydrocracking Agent 2/Isomerism Agent 2 | Hydrofining Agent 2/Hydrocracking Agent 2 |
| Reaction Pressure/MPa | 7.0 | 10.0 |
| Refining/Modification/Isomerism Liquid Hourly Space Velocity/h$^{-1}$ | 2.0/1.3/1.0 | 1.5/2.0 |
| Refining/Modification/Isomerism Reaction Temperature/° C. | 350/370/350 | 350/370 |
| Volume Ratio of Hydrogen to Oil | 900:1 | 900:1 |

TABLE 5

Properties of Aviation Kerosene and Diesel

| Items | Example 2 | Comparison example |
|---|---|---|
| Aviation Kerosene | | |
| Smoke Point/mm | 28 | 24 |
| Freezing Point/° C. | <−50 | −45 |
| Density/g · cm$^{-3}$ | 0.7846 | 0.7985 |
| Boiling Range (ASTM-D1160) | | |
| IBP/10% | 134/149 | 125/147 |
| 50%/90% | 187/218 | 192/224 |
| 95%/EBP | 234/251 | 246/263 |
| Yield/% | 30 | 20 |
| Diesel | | |
| Density/g · cm$^{-3}$ | 0.8075 | 0.8047 |
| Condensation Point/° C. | −16 | −4 |
| Cetane Number | 64 | 65 |
| Boiling Range (ASTM-D1160) | | |
| IBP/10% | 245/276 | 258/288 |
| 50%/90% | 308/327 | 320/341 |
| 95%/EBP | 341/356 | 352/368 |
| Yield/% | 66 | 46 |

As shown in Examples 1 and 2, compared to the current hydrofining-hydrocracking plans, the operating conditions of the technical plan are milder and the smoke point and freezing point of aviation kerosene can both meet the quality standard of 3# aviation kerosene, the product yield increases by over 10% and the cetane number is greater than 60. Although the cetane number is a little lower, the diesel yield increases by 20%.

The embodiments illustrate the advantages of the method of the invention more clearly and the level that the products of the invention can reach. According to the method of the invention, all compositions of Fischer-Tropsch synthetic oil are fully utilized. Compared to the ordinary technique for producing middle distillates by hydrocracking of Fischer-Tropsch synthetic wax, the method of the invention has the obvious advantages that the product quality is good and the yield is high.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An apparatus for producing diesel fuel and jet fuel using Fischer-Tropsch synthetic oil, the apparatus comprising a hydrofining reactor, a hot separator, a first rectifying column, a hydrocracking reactor, a hydroisomerization reactor, a second rectifying column, a first mixing chamber, and a second mixing chamber; wherein:
the hydrofining reactor comprises a raw material inlet and a hydrofining product outlet;
the hot separator comprises a separated oil outlet and a hydrofining product inlet which is connected to the hydrofining product outlet;
the first rectifying column comprises a tail oil fraction outlet, a diesel fraction outlet, and a separated oil inlet which is connected to the separated oil outlet;

the first mixing chamber comprises a circulating hydrogen inlet, a first mixture outlet, and a tail oil fraction inlet which is connected to the tail oil fraction outlet;

the hydrocracking reactor comprises a hydrocracking product outlet and a first mixture inlet which is connected to the first mixture outlet;

the second mixture chamber comprises a renewal hydrogen inlet, a second mixture outlet, and a diesel fraction inlet which is connected to the diesel fraction outlet;

the hydroisomerization reactor comprises a hydroisomerization product outlet and a second mixture inlet which is connected to the second mixture outlet;

the second rectifying column comprises an aviation kerosene outlet, a diesel outlet, and a hydrogenation product mixture inlet which is connected to the hydrocracking product outlet and the hydroisomerization product outlet;

the apparatus further comprises a condensation fractionating column; the condensation fractionating column comprises a gas inlet, a fourth gas outlet, and a liquid outlet;

the hot separator further comprises a first gas outlet; the first rectifying column further comprises a second gas outlet; the second rectifying column further comprises a third gas outlet;

the first gas outlet of the hot separator, the second gas outlet of the first rectifying column, and the third gas outlet of the second rectifying column are connected to the gas inlet of the condensation fractionating column; and the fourth gas outlet of the condensation fractionating column is connected to the raw material inlet of the hydrofining reactor via a pipe;

the second rectifying column further comprises a naphtha fraction outlet and a discharge pipe of the tail oil fraction and paraffin; the first rectifying column further comprises a naphtha fraction outlet; the discharge pipe of the tail oil fraction and paraffin is connected to the tail oil inlet of the first mixing chamber; the discharge pipe of the tail oil fraction and paraffin is connected to a paraffin outlet through a tee joint; and the pipe that connects the fourth gas outlet of the condensation fractionating column to the raw material inlet of the hydrofining reactor is connected to an oil mixture inlet pipe and a circulating hydrogen inlet pipe.

2. A method for producing diesel fuel and jet fuel, the method comprising:

1) transporting Fischer-Tropsch synthetic oil to a pipe that is connected to a raw material inlet of a hydrofining reactor through an oil mixture inlet pipe, introducing circulating hydrogen to the pipe through a circulating hydrogen inlet pipe, mixing and inputting the circulating hydrogen and the Fischer-Tropsch synthetic oil to the hydrofining reactor via the raw material inlet of the hydrofining reactor for a hydrofining reaction in the presence of a hydrofining catalyst to produce hydrofining products;

2) allowing the hydrofining products obtained from 1) to enter a hot separator via a hydrofining product inlet of the hot separator to produce separated oil and cracking oil gas; discharging the separated oil from the hot separator via a separated oil outlet of the hot separator and introducing the separated oil discharged from the hot separator to a first rectifying column via a separated oil inlet of the first rectifying column, discharging the cracking oil gas from the hot separator via a first gas outlet of the hot separator;

3) rectifying the separated oil to yield tail oil fraction, diesel fraction, naphtha fraction, and cracking oil gas in the first rectifying column; discharging the tail oil fraction from the first rectifying column through a tail oil fraction outlet of the first rectifying column and allowing the tail oil fraction discharged from the first rectifying column to enter a first mixing chamber through a tail oil fraction inlet of the first mixing chamber; allowing the circulating hydrogen to enter the first mixing chamber through a circulating hydrogen inlet of the first mixing chamber; mixing the tail oil fraction and the circulating hydrogen in the first mixing chamber to obtain a first resulting mixture and allowing the first resulting mixture to enter a hydrocracking reactor through a first mixture outlet of the first mixing chamber and a first mixture inlet of the hydrocracking reactor; discharging the diesel fraction from the first rectifying column through a diesel fraction outlet of the first rectifying column and allowing the diesel fraction discharged from the first rectifying column to enter a second mixing chamber through a diesel fraction inlet of the second mixing chamber; introducing renewal hydrogen to enter the second mixing chamber through a renewal hydrogen inlet of the second mixing chamber; mixing the diesel fraction and the renewal hydrogen in the second mixing chamber to obtain a second resulting mixture and allowing the second resulting mixture to enter a hydroisomerization reactor through a second mixture outlet of the second mixing chamber and a second mixture inlet of the hydroisomerization reactor; discharging the naphtha fraction from the first rectifying column through a naphtha fraction outlet of the first rectifying column; and discharging the cracking oil gas from the first rectifying column through a second gas outlet of the first rectifying column;

4) hydrocracking the first resulting mixture in the hydrocracking reactor to produce hydrocracking products; hydroisomerizing the second resulting mixture in the hydroisomerization reactor to produce hydroisomerization products;

5) discharging the hydrocracking products from the hydrocracking reactor through a hydrocracking product outlet of the hydrocracking reactor; discharging the hydroisomerization products from the hydroisomerization reactor through a hydroisomerization product outlet of the hydroisomerization reactor; mixing the hydrocracking products and the hydroisomerization products to obtain a third resulting mixture and allowing the third resulting mixture to enter a second rectifying column through a hydrogenation product mixture inlet of the second rectifying column; rectifying the third resulting mixture to produce cracking oil gas, aviation kerosene, diesel, paraffin, tail oil fraction, and naphtha fraction in the second rectifying column; discharging the aviation kerosene from the second rectifying column to an aviation kerosene tank through an aviation kerosene outlet of the second rectifying column, discharging the diesel from the second rectifying column to a diesel tank through a diesel outlet of the second rectifying column; discharging the naphtha fraction from the second rectifying column to a naphtha fraction tank through a naphtha fraction outlet of the second rectifying column;

discharging a mixture of the tail oil fraction and the paraffin from the second rectifying column through a paraffin outlet of the second rectifying column, or recycling the mixture of the tail oil fraction and the paraffin from the second rectifying column along a discharge pipe of the tail oil fraction and paraffin to enter the first mixing chamber via the tail oil fraction inlet of the first mixing chamber to mix with the circulating hydrogen and then to enter the hydrocracking reactor, wherein the paraffin outlet of the second rectifying column is connected to the discharge pipe of the tail oil fraction and paraffin via a tee joint; and discharging the cracking oil gas from the second rectifying column through a third gas outlet of the second rectifying column; and 6) mixing and introducing the cracking oil gas discharged in 2), 3), and 5) to a condensation fractionating column via the a gas inlet of the condensation fractionating column, to yield gas and liquid;

discharging the gas from the condensation fractionating column via a fourth gas outlet of the condensation fractionating column and then allowing the gas discharged from the condensation fractionating column to enter the hydrofining reactor via the pipe that is connected to the raw material inlet of the hydrofining reactor for cyclic utilization; and discharging the liquid from the condensation fractionating column via a liquid outlet of the condensation fractionating column and then converging the liquid discharged from the condensation fractionating column with the naphtha fraction discharged in 3) and 5) to yield ethylene pyrolysis materials.

3. The method of claim 2, wherein the Fischer-Tropsch synthetic oil used in 1) has a temperature ranging between 200° C. and 240° C.), or ranging between 250° C. and 350° C.), or part and/or full-range distillate mixture thereof.

4. The method of claim 2, wherein in 1), reaction conditions in the hydrofining reactor are as follows: a reaction temperature ranges between 260° C. and 400° C.; a reaction pressure ranges between 2.0 MPa and 20.0 MPa; a liquid hourly space velocity ranges between 0.5 $h^{-1}$ and 3.0 $h^{-1}$; and a volume ratio of hydrogen to oil ranges between 500:1 and 2000:1.

5. The method of claim 2, wherein in 4), reaction conditions in the hydroisomerization reactor are as follows: a reaction temperature ranges between 280° C. and 400° C.; a reaction pressure ranges between 4.0 MPa and 15.0 MPa; a liquid hourly space velocity ranges between 0.5 $h^{-1}$ and 3.0 $h^{-1}$; and a volume ratio of hydrogen to oil ranges between 500:1 and 2000:1.

6. The method of claim 2, wherein in 4), reaction conditions in the hydrocracking reactor are as follows: a reaction temperature ranges between 280° C. and 450° C.; a reaction pressure ranges between 5.0 MPa and 20.0 MPa; a liquid hourly space velocity ranges between 0.5 $h^{-1}$ and 3.0 $h^{-1}$; and a volume ratio of hydrogen to oil ranges between 500:1 and 2000:1.

7. The method of claim 4, wherein in 1), the reaction conditions in the hydrofining reactor are as follows: the reaction temperature ranges between 280° C. and 390° C.; the reaction pressure ranges between 4.0 MPa and 15.0 MPa; the liquid hourly space velocity ranges between 0.5 $h^{-1}$ and 2.0 $h^{-1}$; and the volume ratio of hydrogen to oil ranges between 500:1 and 1500:1.

8. The method of claim 5, wherein in 4), the reaction conditions in the hydroisomerization reactor are as follows: the reaction temperature ranges between 280° C. and 370° C.; the reaction pressure ranges between 5.0 MPa and 12.0 MPa; the liquid hourly space velocity ranges between 0.5 $h^{-1}$ and 2.0 $h^{-1}$; and the volume ratio of hydrogen to oil ranges between 500:1 and 1500:1.

9. The method of claim 6, wherein the in 4), reaction conditions in the hydrocracking reactor are as follows: the reaction temperature ranges between 320° C. and 400° C.; the reaction pressure ranges between 5.0 MPa and 15.0 MPa; the liquid hourly space velocity ranges between 0.5 $h^{-1}$ and 2.0 $h^{-1}$; and the volume ratio of hydrogen to oil ranges between 700:1 and 1500:1.

* * * * *